US012182629B2

(12) United States Patent
Guo

(10) Patent No.: US 12,182,629 B2
(45) Date of Patent: Dec. 31, 2024

(54) DATABASE ACCESS METHOD AND APPARATUS, COMPUTING DEVICE, AND COMPUTER PROGRAM PRODUCT FOR LOAD BALANCING BETWEEN DATABASE ACCESS SERVICE ENGINES

(71) Applicant: Huawei Cloud Computing Technologies Co., Ltd., Guizhou (CN)

(72) Inventor: Shoumin Guo, Shenzhen (CN)

(73) Assignee: Huawei Cloud Computing Technologies Co., Ltd., Guizhou (CN)

(*) Notice: Subject to any disclaimer, the term of this patent is extended or adjusted under 35 U.S.C. 154(b) by 333 days.

(21) Appl. No.: 17/541,242

(22) Filed: Dec. 2, 2021

(65) Prior Publication Data
US 2022/0091902 A1 Mar. 24, 2022

Related U.S. Application Data

(63) Continuation of application No. PCT/CN2020/084353, filed on Apr. 11, 2020.

(30) Foreign Application Priority Data

Jun. 29, 2019 (CN) .......................... 201910581051.0

(51) Int. Cl.
G06F 9/50 (2006.01)
(52) U.S. Cl.
CPC ............ *G06F 9/5077* (2013.01); *G06F 9/505* (2013.01); *G06F 9/5055* (2013.01)

(58) Field of Classification Search
None
See application file for complete search history.

(56) References Cited

U.S. PATENT DOCUMENTS

| 7,502,776 | B2 | 3/2009 | Venkatesan et al. |
| 8,984,170 | B2* | 3/2015 | Colrain ................. H04L 67/148 |
| | | | 707/703 |
| 9,032,218 | B2* | 5/2015 | Iswandhi ................ G06F 12/00 |
| | | | 713/189 |
| 9,141,435 | B2* | 9/2015 | Wein ..................... G06F 16/217 |

(Continued)

FOREIGN PATENT DOCUMENTS

| CN | 103023986 A | 4/2013 |
| CN | 105095317 A | 11/2015 |

(Continued)

*Primary Examiner* — Van H Nguyen

(57) ABSTRACT

This application discloses a method. A database access scheduling module (331 to 333) establishes a communication connection to a database access service engine (121 to 123) using an identifier of the database access service engine (121 to 123). The database access scheduling module (331 to 333) receives an access request sent by the database access service engine (121 to 123), where the access request carries an identifier of a database instance (371 to 375). The database access scheduling module (331 to 333) sends the access request to the database instance (371 to 375). In this way, the database access service engine (121 to 123) may send the access request to the database instance through the database access scheduling module (331 to 333) based on the communication connection actively established by the database access scheduling module (331 to 333) to the database access service engine (121 to 123).

19 Claims, 7 Drawing Sheets

(56) References Cited

U.S. PATENT DOCUMENTS

| | | | |
|---|---|---|---|
| 9,633,054 B2 * | 4/2017 | Salinas | G06F 16/25 |
| 10,318,346 B1 * | 6/2019 | Harizopoulos | G06F 3/0626 |
| 10,534,772 B2 * | 1/2020 | Prasanna Kumar | G06F 16/2471 |
| 10,726,035 B2 * | 7/2020 | Fang | G06F 16/25 |
| 11,277,474 B2 * | 3/2022 | Ramsay | H04L 67/1097 |
| 2006/0143189 A1 | 6/2006 | Imaeda et al. | |
| 2007/0130154 A1 | 6/2007 | Venkatesan et al. | |
| 2015/0310221 A1 * | 10/2015 | Lietz | G06F 21/6209 713/193 |
| 2017/0344584 A1 | 11/2017 | Parappalliyalil et al. | |

FOREIGN PATENT DOCUMENTS

| | | |
|---|---|---|
| CN | 108093094 A | 5/2018 |
| CN | 108959385 A | 12/2018 |
| CN | 109542611 A | 3/2019 |
| EP | 1645971 A1 | 4/2006 |

\* cited by examiner

DATABASE ACCESS METHOD AND APPARATUS, COMPUTING DEVICE, AND COMPUTER PROGRAM PRODUCT FOR LOAD BALANCING BETWEEN DATABASE ACCESS SERVICE ENGINES

CROSS-REFERENCE TO RELATED APPLICATIONS

This application is a continuation of International Patent Application No. PCT/CN2020/084353, filed on Apr. 11, 2020, which claims priority to Chinese Patent Application No. 201910581051.0, filed on Jun. 29, 2019. The disclosures of the aforementioned applications are hereby incorporated by reference in their entireties.

TECHNICAL FIELD

This application relates to the database field, and in particular, to a database access method, a database access initiation module, a database access service engine, a database access scheduling module, a computing device, and a computer program product.

BACKGROUND

In the current technology, a database connection pool is deployed inside an application. One database connection pool provides a service for only one application to access a database instance.

In addition, a single application may be deployed on a plurality of servers in a distributed manner. A database connection pool of the application is deployed on each server. All connections in each database connection pool are used to connect to a same database instance. In other words, if the application needs to connect to a plurality of database instances through each server, a connection pool needs to be deployed for each database instance on each server. However, database connection pools, on different servers, that are used by the single application to access the same database instance cannot be shared between the different servers.

In addition, in the conventional technology, to access a database instance, a connection in a connection pool is established by using an Internet Protocol (IP) address and a port number of the database instance.

SUMMARY

In view of this, this application provides a database access method, a database access initiation module, a database access service engine, a computing device, and a computer program product, so as to establish a connection used to access a database instance without exposing an IP address and a port of the database instance.

According to a first aspect, in the database access method provided in this application, a database access scheduling module establishes a communication connection to a database access service engine by using an identifier of the database access service engine (for example, an IP address of the database access service engine). Then, the database access scheduling module receives an access request sent by the database access service engine, where the access request carries an identifier of a database instance. The database access scheduling module sends the access request to the database instance.

In this way, when receiving an access request of an application, the database access service engine may send the access request to the database instance through the database access scheduling module based on the communication connection actively established by the database access scheduling module to the database access service engine.

In an embodiment of the first aspect, a request for establishing the communication connection that is sent by the database access scheduling module to the database access service engine carries the identifier of the database access service engine and a public key of the database access service engine. In this way, the database access engine may perform authentication, based on the public key of the database access service engine, on whether to agree to establish the communication connection with the database access scheduling module.

In an embodiment of the first aspect, when the access request received by the database access scheduling module from the database access service engine has been encrypted based on a public key of the database access scheduling module, the database access scheduling module decrypts the encrypted access request by using a private key of the database access scheduling module to obtain the access request, to send the decrypted access request to the database instance.

In an embodiment of the first aspect, the database instance processes the access request, obtains a processing result, and sends the processing result to the database access scheduling module. The database access scheduling module receives the processing result sent by the database instance. Then, the database access scheduling module sends the processing result to the database access service engine. In this way, the database access service engine implements access to the database instance by using the access request.

Optionally, the database access scheduling module encrypts the processing result by using the public key of the database access service engine, so that the database access scheduling module sends the encrypted processing result to the database access service engine.

According to a second aspect, in the database access method provided in this application, if an application needs to access a database instance, the application sends an access request of the application to a database access initiation module, where the access request carries an identifier of the database instance.

When receiving the access request, the database access initiation module determines a database access service engine used to access the database instance, and sends the access request to the determined database access service engine. The database access service engine is deployed independently of the application.

The database access service engine may establish a connection to a database access implementation module (for example, a database instance or a database access scheduling module).

If the connection is established between the database access service engine and the database instance, the database access service engine may send the access request to the database instance through the connection, and the database instance processes the access request.

If the connection is established between the database access service engine and the database access scheduling module, the database access service engine may send the access request to the database access scheduling module through the connection. In this way, the database access scheduling module may send the access request to the database instance, so that the database instance can process the access request.

Different from the current technology in which a connection provided by a connection pool inside an application is used to access a database instance, this application implements access to the database instance by using a database access service engine independent of the application. In addition, the connection used to access the database instance is established by the access service engine, and is not maintained by the application. This reduces load of the application.

In an embodiment of the second aspect, when the database access initiation module receives the access request, the database access initiation module selects one database access service engine from a plurality of database access service engines, and sends the access request to the selected database access service engine. In this way, the plurality of database access service engines may share a pressure of forwarding a plurality of access requests.

In an embodiment of the second aspect, when the database access initiation module receives the access request, the database access initiation module selects one database access service engine from a plurality of database access service engines based on load of the plurality of database access service engines. In this way, load sharing may be implemented among the plurality of database access service engines.

Optionally, load of each database access service engine is a quantity of connections established between the database access service engine and the database access implementation module (for example, the database instance or the database access scheduling module). A larger quantity indicates heavier load of the database access service engine. Conversely, a smaller quantity indicates lighter load of the database access service engine.

In an embodiment of the second aspect, when the database access initiation module receives the access request, the database access initiation module selects a database access service engine with smallest load from a plurality of database access service engines. Optionally, load of each database access service engine is a quantity of connections established between the database access service engine and the database access implementation module (for example, the database instance or the database access scheduling module).

In an embodiment of the second aspect, when the database access initiation module receives the access request, if the access request carries the identifier of the database instance, and a database access service engine that has established a connection to the database instance already exists, the database access service engine bound to the identifier of the database instance is determined.

In an embodiment of the second aspect, when the database access initiation module receives the access request, if the access request carries an identifier of the database access scheduling module, and a database access service engine that has established a connection to the database access scheduling module already exists, the database access service engine bound to the database access scheduling module is determined. In this way, the database access initiation module sends the access request to the database access service engine, so that the database access scheduling module receives the access request from the database access service engine. Because a database instance specified in the access request is associated with the database access scheduling module, the database access scheduling module can forward the access request to the database instance specified in the access request only after the database access scheduling module receives the access request.

In an embodiment of the second aspect, when the database access service engine receives the access request, the database access service engine establishes a connection between the database access service engine and the database instance based on the identifier of the database instance. In this way, based on the connection, data may be communicated between the database access service engine and the database instance. For example, the database access service engine sends the access request to the database instance. For example, the database instance sends a processing result corresponding to the access request to the database access service engine.

In an embodiment of the second aspect, when the database access service engine receives the access request, if the access request carries a keyword for identifying a connection, the connection identified by the keyword that has been established between the database access service engine and the database instance is used to send the access request to the database instance.

In this way, if the keyword is specified by the application, the application may access the same database instance through the same connection based on the keyword.

In an embodiment of the second aspect, when the database access service engine receives the access request, if the access request does not carry the keyword for identifying the connection, the database access service engine establishes the connection between the database access service engine and the database instance based on the identifier of the database instance. Because the access request does not carry the keyword for identifying the connection, the database access service engine still needs to establish a new connection even if a connection already exists between the database access service engine and the database instance. Data related to the access request (for example, the access request or the processing result corresponding to the access request) is communicated between the database access service engine and the database instance through the newly established connection.

In an embodiment of the second aspect, when the database access service engine receives the access request, if the access request carries the identifier of the database access scheduling module, the database access service engine sends the access request to the database access scheduling module.

For example, when a communication connection has been established between the database access service engine and the database access scheduling module, the application may specify the identifier of the database access scheduling module in the access request. In this way, the database access service engine may determine the communication connection based on the identifier of the database access scheduling module, and the database access service engine may continue to use the communication connection, to send the access request to the database access scheduling module.

If a plurality of applications separately specify an identifier of a same database access scheduling module in their own access requests, the database access service engine, the communication connection between the database access service engine and the database access scheduling module, and the database access scheduling module may be shared to communicate data related to these access requests.

In an embodiment of the second aspect, after the database instance processes the access request and generates the processing result corresponding to the access request, if the database instance is directly connected to the database access service engine, the database instance sends the processing result to the database access service engine. Alternatively, if the database instance is connected to the database access scheduling module, the database instance sends the processing result to the database access scheduling module, so that the database access scheduling module forwards the processing result to the database access service engine.

The database access service engine sends the processing result to the database access initiation module. Correspondingly, the database access initiation module sends the processing result to the application.

In this way, the application can access the database instance by using the access request, and obtain the processing result of the access request.

According to a third aspect, this application provides a database access apparatus. Functional modules included in the apparatus are configured to implement the steps performed by the database access initiation module in the method provided in the first aspect or any possible design of the first aspect, or configured to implement the steps performed by the database access initiation module in the method provided in the second aspect or any possible design of the second aspect.

This application provides another database access apparatus. Functional modules included in the apparatus are configured to implement the steps performed by the database access service engine in the method provided in the first aspect or any possible design of the first aspect, or configured to implement the steps performed by the database access service engine in the method provided in the second aspect or any possible design of the second aspect.

This application provides another database access apparatus. Functional modules included in the apparatus are configured to implement the steps performed by the database access implementation module (for example, the database instance or the database access scheduling module) in the method provided in the first aspect or any possible design of the first aspect, or configured to implement the steps performed by the database access implementation module (for example, the database instance or the database access scheduling module) in the method provided in the second aspect or any possible design of the second aspect.

According to a third aspect, this application provides a computing device. The computing device includes a processor and a memory. The memory stores computer instructions. The processor executes the computer instructions stored in the memory, so that the computing device is enabled to perform the steps performed by the database access initiation module in the method provided in the first aspect or the possible designs of the first aspect, or the computing device is enabled to perform the steps performed by the database access service engine in the method provided in the first aspect or the possible designs of the first aspect, or the computing device is enabled to perform the steps performed by the database access implementation module (for example, the database instance or the database access scheduling module) in the method provided in the first aspect or the possible designs of the first aspect, or the computing device is enabled to perform the steps performed by the database access initiation module in the method provided in the second aspect or the possible designs of the second aspect, or the computing device is enabled to perform the steps performed by the database access service engine in the method provided in the second aspect or the possible designs of the second aspect, or the computing device is enabled to perform the steps performed by the database access implementation module (for example, the database instance or the database access scheduling module) in the method provided in the second aspect or the possible designs of the second aspect.

According to a fourth aspect, this application provides a computer-readable storage medium. The computer-readable storage medium stores computer instructions. When a processor of a computing device executes the computer instructions, the computing device performs the steps performed by the database access initiation module in the method provided in the first aspect or the possible designs of the first aspect, or the computing device performs the steps performed by the database access service engine in the method provided in the first aspect or the possible designs of the first aspect, or the computing device performs the steps performed by the database access implementation module (for example, the database instance or the database access scheduling module) in the method provided in the first aspect or the possible designs of the first aspect, or the computing device performs the steps performed by the database access initiation module in the method provided in the second aspect or the possible designs of the second aspect, or the computing device performs the steps performed by the database access service engine in the method provided in the second aspect or the possible designs of the second aspect, or the computing device performs the steps performed by the database access implementation module (for example, the database instance or the database access scheduling module) in the method provided in the second aspect or the possible designs of the second aspect.

According to a fifth aspect, this application provides a computer program product. The computer program product includes computer instructions, and the computer instructions are stored in a computer-readable storage medium. A processor of a computing device may read the computer instructions from the computer-readable storage medium, and executes the computer instructions, so that the computing device is enabled to perform the steps performed by the database access initiation module in the method provided in the first aspect or the possible designs of the first aspect, or the computing device is enabled to perform the steps performed by the database access service engine in the method provided in the first aspect or the possible designs of the first aspect, or the computing device is enabled to perform the steps performed by the database access implementation module (for example, the database instance or the database access scheduling module) in the method provided in the first aspect or the possible designs of the first aspect, or the computing device is enabled to perform the steps performed by the database access initiation module in the method provided in the second aspect or the possible designs of the second aspect, or the computing device is enabled to perform the steps performed by the database access service engine in the method provided in the second aspect or the possible designs of the second aspect, or the computing device is enabled to perform the steps performed by the database access implementation module (for example, the database instance or the database access scheduling module) in the method provided in the second aspect or the possible designs of the second aspect.

DETAILED DESCRIPTION OF EMBODIMENTS

The following describes technical solutions in this application with reference to accompanying drawings in this application.

Figure 1:
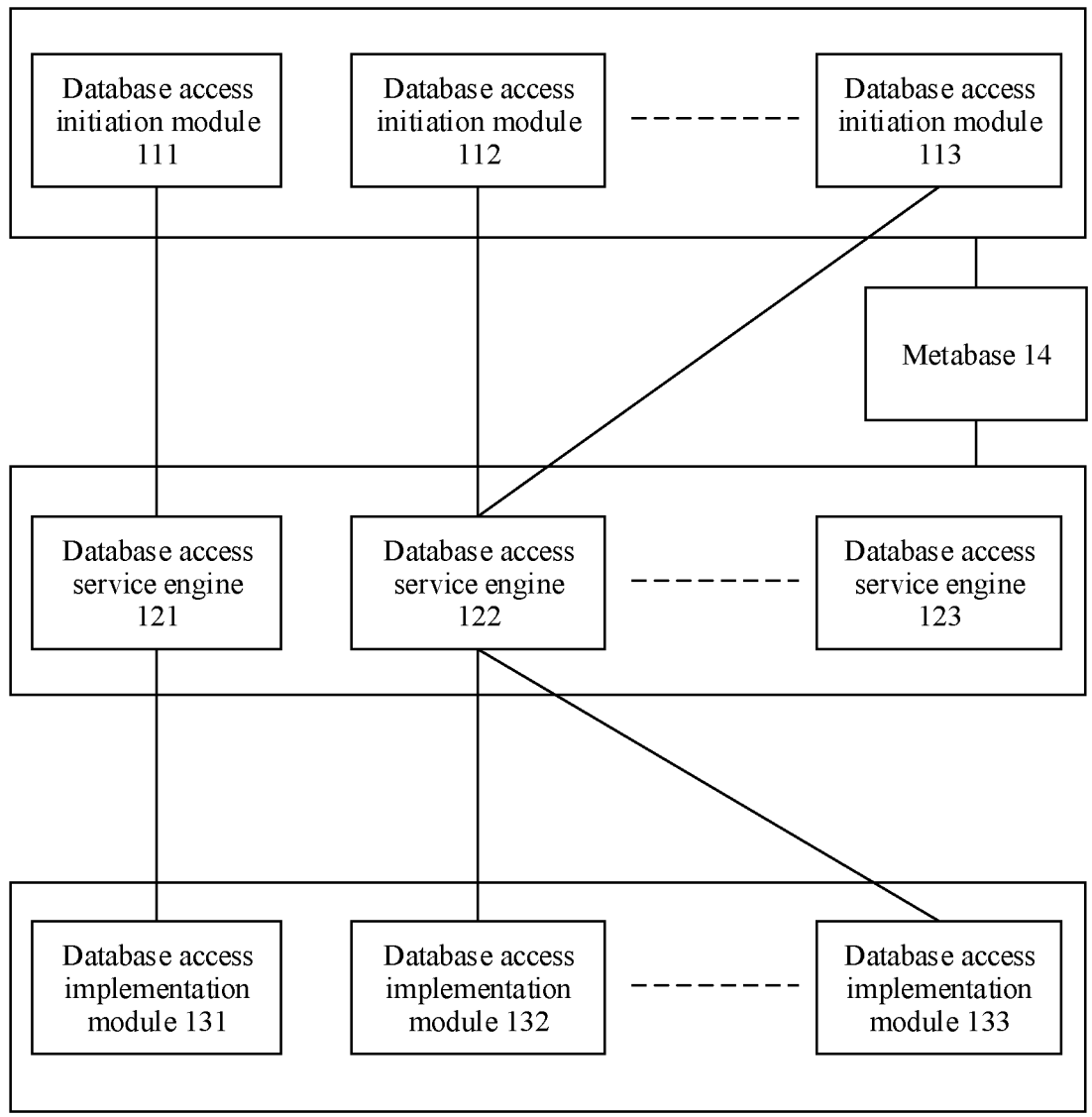
FIG. 1 is a schematic diagram of an application scenario to which this application is applicable.

FIG. 1 is a possible scenario to which this application is applicable. A database access initiation module (for example, a database access initiation module 111, a database access initiation module 112, or a database access initiation module 113) is configured to receive an access request, and forward the access request to a database access service engine. The database access service engine (for example, a database access service engine 121, a database access service engine 122, or a database access service engine 123) is configured to forward the access request to a database access implementation module. The database access implementation module (for example, a database access implementation module 131, a database access implementation module 132, or a database access implementation module 133) is configured to schedule or process the access request.

In this application, the database access service engine is deployed independently of an application. For example, the database access service engine is not integrated into the application. For example, the database access service engine and the application are deployed on different servers. In this way, the database access service engine may serve different database access initiation modules.

Optionally, the database access initiation module may be integrated into the application. Optionally, the database access initiation module may be deployed independently of the application. For example, both the application and the database access initiation module are deployed on a server on which the application is located.

The database access initiation module may receive an access request from the application. In a possible implementation, the access request may include a statement in an SQL format, and "the statement in the SQL format" may be referred to as "an SQL statement" for short below. For example, a user may operate the application to enter an SQL statement, to trigger the application to generate an access request including the SQL statement.

Optionally, the database access initiation module may be implemented as a software development kit (SDK).

In a possible implementation, each database access initiation module provides a service for a single application. Each database access initiation module receives an access request generated by an application for which the database access initiation module is responsible. For example, the database access initiation module 111 may be responsible for receiving an access request of an application. Both the database access initiation module 112 and the database access initiation module 113 may be responsible for receiving an access request of another application. For example, the another application may send an access request to the database access initiation module 112 or the database access initiation module 113. In this way, load balancing of receiving the access request of the another application may be implemented by using the database access initiation module 112 and the database access initiation module 113.

The database access initiation module may send the access request to the database access service engine.

FIG. 1 is used as an example. The database access initiation module 111 may search a metabase 14, and determine, by using the metabase 14, that currently a database access service engine with smallest load is the database access service engine 121. In this case, the database access initiation module 111 sends the access request of the application to the database access service engine 121. Load balancing may be performed between database access service engines.

Figure 2:
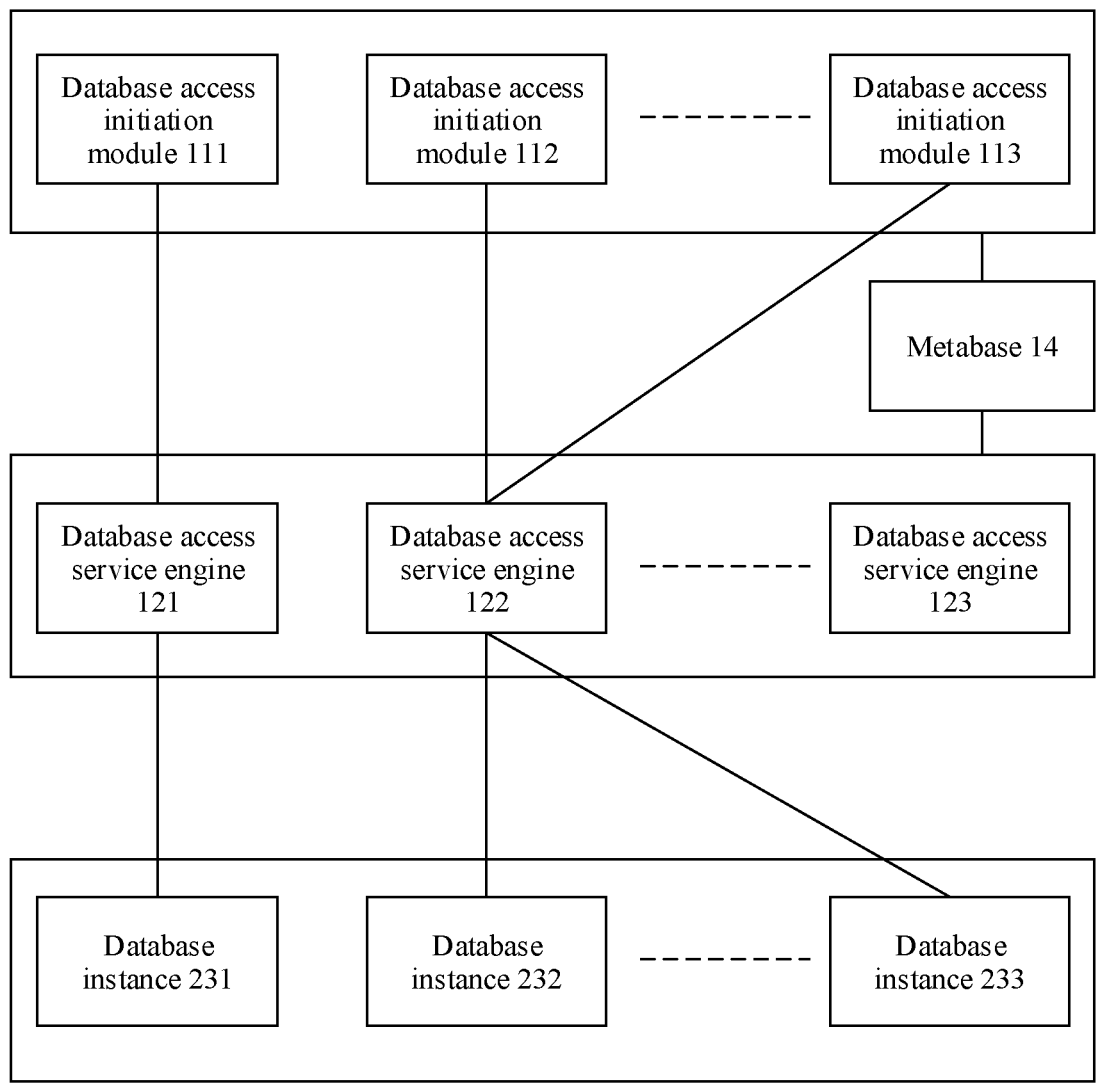
FIG. 2 is a schematic diagram of an application scenario to which this application is applicable.

For example, with reference to FIG. 1 and FIG. 2, in a scenario in which the database access implementation module 131 is the database instance 231, if the application specifies, through the access request, an identifier of the to-be-accessed database instance 231 (for example, an Internet Protocol (IP) address and a port number of the database instance 231), the database access initiation module 111 records, in the metabase 14, a binding relationship between the identifier of the database instance 231 and the database access service engine 121. Subsequently, when the database access initiation module 111 receives a new access request of the application, if the new access request carries the identifier of the database instance 231, the database access initiation module 111 finds the binding relationship in the metabase 14 based on the identifier of the database instance 231, and sends the new access request to the database access service engine 121 specified by the binding relationship.

In addition, with reference to FIG. 1 and FIG. 2, in the scenario in which the database access implementation module 131 is the database instance 231, the database access service engine 121 may establish, based on the identifier of the database instance 231, a connection for accessing the database instance 231. In a possible implementation, after the database access service engine 121 successfully establishes the connection to the database instance 231, the database access service engine 121 records a keyword (key) used to identify the connection. Optionally, the database access service engine 121 may further send the keyword to the database access initiation module 111, so that the database access initiation module 111 feeds back the keyword to the application.

Optionally, the database access service engine 121 may further record, in the metabase 14, a quantity of connections that have been established by the database access service engine 121. In this way, a larger quantity of connections, recorded in the metabase 14, that belong to the database access service engine 121 indicates heavier load of the database access service engine 121. Conversely, a smaller quantity of connections, recorded in the metabase 14, that belong to the database access service engine 121 indicates lighter load of the database access service engine 121. Similarly, the metabase 14 records a quantity of connections that each database access service engine has. Subsequently, the database access initiation module may perform load balancing among a plurality of database access service engines based on the quantities of connections. For example, the database access service engine with smallest load is selected from the plurality of database access service engines shown in FIG. 1 based on the quantities of connections.

In a possible implementation of this application, with reference to FIG. 1 and FIG. 2, the database access implementation module may be a database instance. When the database instance receives the access request sent by the database access service engine, the database instance processes the access request. For example, the database access implementation module 133 is the database instance 233. After receiving an access request sent by the database access service engine 122, the database instance 233 processes an SQL statement carried in the access request.

Figure 3:
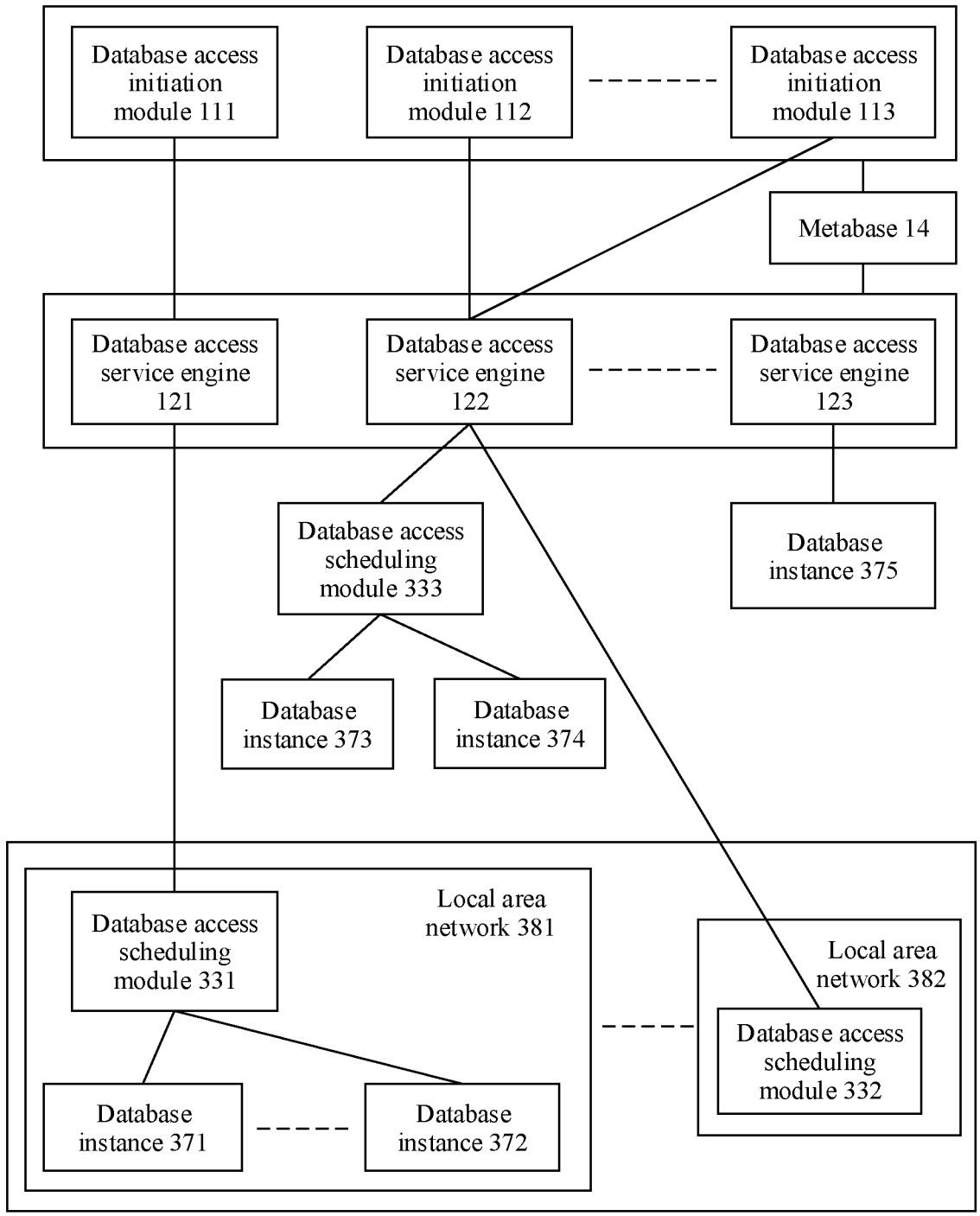
FIG. 3 is a schematic diagram of an application scenario to which this application is applicable.

In a possible implementation of this application, with reference to FIG. 1 and FIG. 3, the database access implementation module may be a database access scheduling module. The database access scheduling module is communicatively connected to at least one database instance. When the database access scheduling module receives an access request sent by the database access service engine, the database access scheduling module sends the access request to a database instance specified in the access request. For example, after a database access scheduling module 333 receives an access request sent by the database access service engine 122, if the access request carries an identifier of a database instance 373, the database access scheduling module 333 sends the access request to the database instance 373. For example, after a database access scheduling module 331 receives an access request sent by the database access service engine 121, if the access request carries an identifier of a database instance 372, the database access scheduling module 331 sends the access request to the database instance 372.

In a possible implementation of this application, as shown in FIG. 3, if the database access scheduling module and the database access service engine are deployed in a same network, for example, both the database access scheduling module 333 and the database access service engine 122 are deployed in a public cloud to provide a service, that is, both the database access scheduling module 333 and the database access service engine 122 are deployed in a network used by the public cloud, the database access scheduling module 333 may access the database instance 373 and a database instance 374. After the database access scheduling module 333 receives an access request sent by the database access service engine 122, if the access request carries the identifier of the database instance 373, the access request is sent to the database instance 373; if the access request carries an identifier of the database instance 374, the access request is sent to the database instance 374. Optionally, both the database instance 373 and the database instance 374 are deployed in the public cloud to provide a service. Both the database instance 373 and the database instance 374 are deployed in the network used by the public cloud.

In a possible implementation of this application, as shown in FIG. 3, if the database access implementation module is deployed in a local area network, the database access implementation module is the database access scheduling module 331 in the local area network. The database access scheduling module 331 may access a database instance in the local area network. For example, the database access scheduling module 331 in a local area network 381 receives an access request sent by the database access service engine 121. The database access scheduling module 331 sends the access request to the database instance 372 based on the identifier of the database instance 372 specified in the access request. The database instance 372 processes the access request, for example, executes an SQL statement carried in the access request.

In the architecture shown in FIG. 3, after the database access scheduling module 333 establishes a communication connection to the database access service engine 122, the database access service engine 122 records, in the metabase 14, a binding relationship between an identifier of the database access scheduling module 332 and the database access service engine 122. Subsequently, if an access request received by the database access initiation module 112 records the identifier of the database access scheduling module 333, the database access initiation module 112 sends the access request to the database access service engine 122 based on the binding relationship recorded in the metabase 14, so that the database access service engine 122 can finally forward the access request to the database access scheduling module 333. It may be learned that a binding relationship between the database access scheduling module and the database access service engine is recorded in the metabase 14.

For example, in an application scenario, the database access service engine 121 is deployed in the public cloud, and the database access scheduling module 331 and a plurality of database instances (for example, the database instance 371 and the database instance 372) are deployed in the local area network 381. The database access scheduling module 331 obtains an IP address of the database access service engine 121. For example, the IP address of the database access service engine 121 is manually entered into the database access scheduling module 331. The database access scheduling module 331 uses the IP address to request to establish a communication connection to the database access service engine 121, for example, to establish a communication connection over the Transmission Control Protocol (TCP). In this way, the database access service engine 121 may establish the communication connection to the database access scheduling module 331, so that the database access service engine 121 in the public cloud can access the plurality of database instances (for example, the database instance 371 and the database instance 372) in the local area network 381 by using the database access scheduling module 331.

Similarly, the database access service engine 122 in the public cloud may access a plurality of database instances (not shown in FIG. 3) in a local area network 382 by using a database access scheduling module 332.

In this way, after a database access scheduling module in the local area network actively establishes a communication connection to a database access service engine in the public cloud, the database access service engine in the public cloud may access a database instance in the local area network by using the database access scheduling module.

In a possible application scenario, the local area network is a private cloud network.

In a possible implementation of this application, in the architecture shown in FIG. 3, after the database access scheduling module 331 in the local area network 381 actively establishes the communication connection to the database access service engine 121, the database access service engine 121 records, in the metabase 14, a binding relationship between an identifier of the database access scheduling module 331 and the database access service engine 121. Subsequently, if an access request received by the database access initiation module 331 records the identifier of the database access scheduling module 331, the database access initiation module 331 sends the access request to the database access service engine 121 based on the binding relationship recorded in the metabase 14, so that the database access service engine 121 can forward the access request to the database access scheduling module 331. Similarly, after the database access scheduling module 332 in the local area network 382 actively establishes a communication connection to the database access service engine 122, the database access service engine 122 records, in the metabase 14, a binding relationship between an identifier of the database access scheduling module 332 and the database access service engine 122. Similarly, after the database access scheduling module 333 actively establishes the communication connection to the database access service engine 122, the database access service engine 122 records, in the metabase 14, the binding relationship between the identifier of the database access scheduling module 333 and the database access service engine 122. It may be learned that the binding relationship between the database access scheduling module and the database access service engine is recorded in the metabase 14 in this application.

In a possible implementation, in the architecture shown in FIG. 3, if a database access service engine is directly connected to a database access scheduling module, a binding relationship between an identifier of the database access scheduling module and the database access service engine is recorded in the metabase 14; if a database access service engine is directly connected to a database instance, a binding relationship between the database instance and the database access service engine is recorded in the metabase 14. In this way, in the architecture shown in FIG. 3, in a process in which a database access initiation module searches the metabase 14 to determine a destination of an access request, if the database access service engine is directly connected to the database access scheduling module, the identifier of the database access scheduling module carried in the access request is used to search for the binding relationship to determine the database access service engine; if the database access service engine is directly connected to the database instance, an identifier of the database instance carried in the access request is used to search for the binding relationship to determine the database access service engine.

Figure 4:
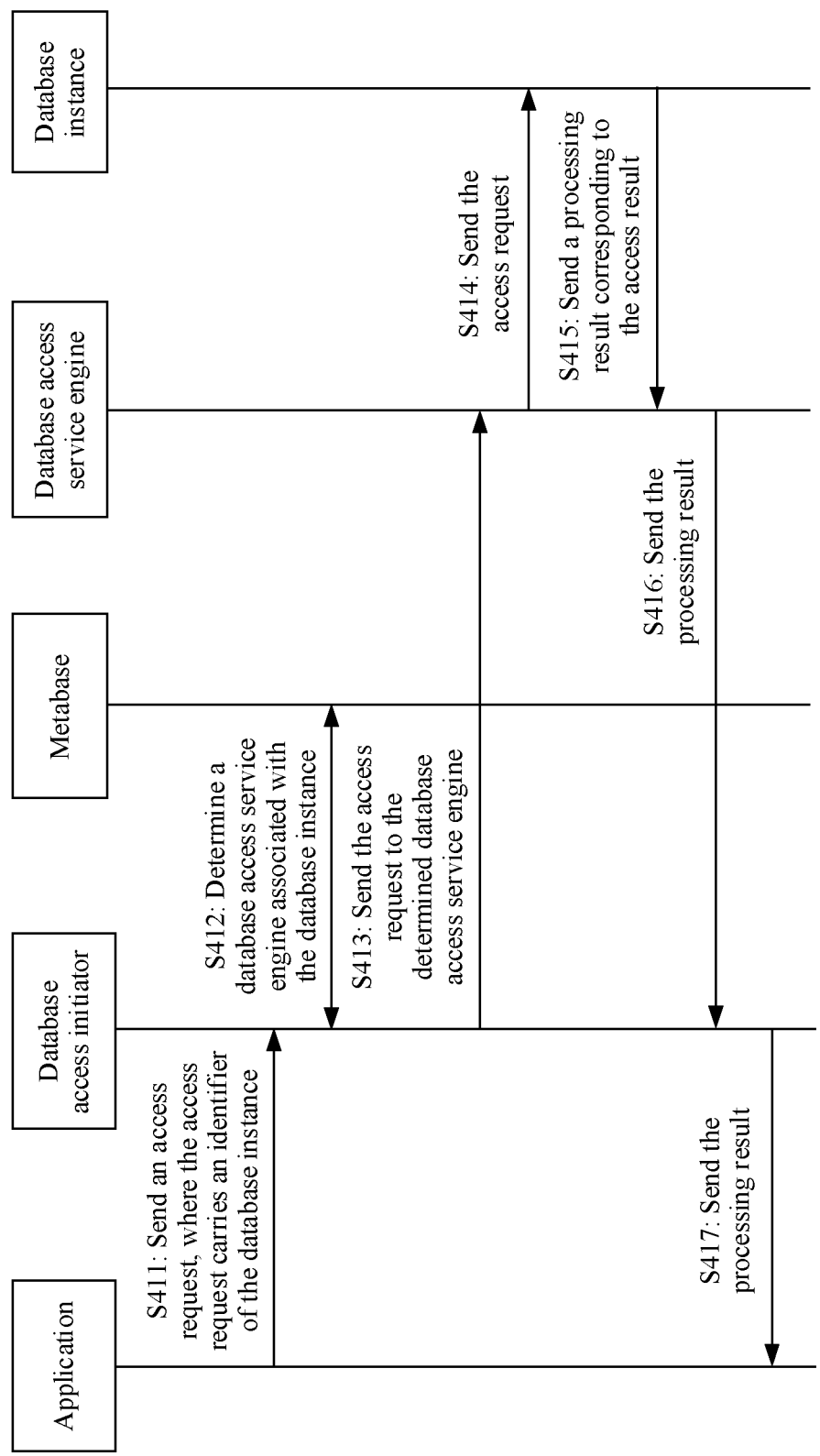
FIG. 4 is a schematic flowchart of a database access method according to this application.

Based on the architecture shown in FIG. 2, this application provides a database access method. With reference to FIG. 2, FIG. 4 shows a procedure of the database access method. The procedure includes step S411 to step S417.

Step S411: An application sends an access request to a database access initiation module.

The application sends the access request to the database access initiation module that provides a service for the application. For example, the database access initiation module 111 provides a service for an application. Access requests generated by the application are all sent by the application to the database access initiation module 111.

The access request carries an identifier of a database instance. In this way, a database instance used to process the access request may be determined based on the identifier of the database instance.

For example, the identifier of the database instance is an IP address of the database instance. For example, the identifier of the database instance is the IP address and a port number of the database instance.

For example, the identifier of the database instance includes a name of the database instance. In this way, whether the database instance is a database instance that needs to be accessed may further be determined based on the name of the database instance.

For example, the identifier of the database instance may be one or a combination of more of the following parameters: the IP address of the database instance, the IP address and the port number, or the name of the database instance.

For example, the access request may carry a statement in an SQL format. In this way, the database instance may execute the statement, in the SQL format, that is carried in the access request.

For example, the access request carries an identifier of a service currently provided by the application.

Step S412: The database access initiation module determines a database access service engine associated with the database instance.

Step S413: The database access initiation module sends the access request to the determined database access service engine.

In a possible implementation, if no database access service engine is allocated to the database instance specified by the identifier of the database instance that is carried in the access request, the database access initiation module selects one database access service engine from a plurality of database access service engines. The database access initiation module sends the access request to the selected database access service engine. Correspondingly, the database access initiation module records, in the metabase 14, a binding relationship between the identifier of the database instance and the database access service engine.

FIG. 2 is used as an example. When receiving an access request sent by an application, the database access initiation module 111 may search the metabase 14. If a search result is that no database access service engine is allocated to a database instance specified by an identifier of the database instance that is carried in the access request, one database access service engine is selected from a plurality of database access service engines (for example, the database access service engine 121, the database access service engine 122, and the database access service engine 123). For example, the database access service engine 121 is selected. In this case, the database access initiation module 111 sends the access request to the database access service engine 121.

FIG. 2 is used as an example. When receiving an access request sent by an application, the database access initiation module 111 may search the metabase 14. If a search result is that no database access service engine is allocated to a database instance specified by an identifier of the database instance that is carried in the access request, one database access service engine is selected from a plurality of database access service engines (for example, the database access service engine 121, the database access service engine 122, and the database access service engine 123) based on load of the plurality of database access service engines. For example, the database access service engine 121 is selected. In this case, the database access initiation module 111 sends the access request to the database access service engine 121.

FIG. 2 is used as an example. When receiving an access request sent by an application, the database access initiation module 111 may search the metabase 14. If a search result is that no database access service engine is allocated to a database instance specified by an identifier of the database instance that is carried in the access request, a database access service engine with smallest load is selected from a plurality of database access service engines (for example, the database access service engine 121, the database access service engine 122, and the database access service engine 123). It is assumed that currently the database access service engine with the smallest load is the database access service engine 121. In this case, the database access initiation module 111 sends the access request to the database access service engine 121. In addition, the database access initiation module 111 records, in the metabase 14, a binding relationship between the database access service engine 121 and the identifier of the database instance.

In a possible implementation, if the binding relationship corresponding to the identifier of the database instance that is carried in the access request is recorded in the metabase 14, the database access initiation module searches the metabase 14 to determine the database access service engine specified by the binding relationship. In this case, the database access initiation module sends the access request to the determined database access service engine.

In a possible implementation, each database access service engine (for example, the database access service engine 121, the database access service engine 122, or the database access service engine 123) periodically records load information (for example, a quantity of deployed connections) and heartbeat information of the database access service engine in the metabase 14. In this way, when determining, by using the metabase 14, the database access service engine used to send the access request, the database access initiation module may further determine, based on heartbeat information of the database access service engine, whether the database access service engine is available. If the database access service engine is available, the database access initiation module performs step S413 to send the access request to the database access service engine. If the database access service engine is unavailable, the database access initiation module re-performs step S412 to select a new database access service engine.

In a possible implementation in which the database access initiation module determines that the database access service engine is available, the database access initiation module determines, based on the heartbeat information of the database access service engine that is recorded in the metabase 14, that the database access service engine does not break down, or that a communication connection of the database access service engine is still maintained.

Step S414: The database access service engine sends the access request to the database instance.

In a possible implementation, if the access request carries a keyword (key) used to identify a connection, where the connection is a connection between the database instance specified in the access request and the database access service engine, and the connection is previously established, the database access service engine sends the access request to the database instance through the connection. In this way, if the keyword for identifying the connection is added to a plurality of access requests sent by the application, these access requests are all sent to the database instance through the same connection. If the plurality of access requests are continuously sent, sending the plurality of access requests to the database instance through the same connection ensures transaction consistency of a transaction formed by the plurality of access requests.

In a possible implementation, if the access request does not carry the keyword used to identify the connection, the database access service engine may establish, for the access request, a new connection between the database access service engine and the database instance specified in the access request. For example, the connection established between the database access service engine and the database instance may be a communication connection, for example, a JDBC (Java database connectivity) connection.

For the new connection established between the database access service engine and the database instance, the database access service engine records a keyword (key) used to identify the connection. FIG. 2 is used as an example. The database access engine 121 records a new connection established between the database access service engine 121 and the database instance 231. The database access engine 122 records a new connection established between the database access service engine 122 and the database instance 232. The database access engine 122 records a keyword used to identify the connection, and records a binding relationship between the keyword and the database instance 231. Subsequently, the database access service engine 122 may determine the keyword based on the binding relationship, to determine the connection specified by the keyword.

In addition, because the access request does not carry the keyword for identifying the connection, the database access service engine still needs to establish a new connection even if a connection already exists between the database access service engine and the database instance. Data related to the access request (for example, the access request or a processing result corresponding to the access request) is communicated between the database access service engine and the database instance through the newly established connection.

Optionally, the database access service engine may further send the keyword to the database access initiation module that previously forwarded the access request, so that the database access initiation module feeds back the keyword to the application that previously generated the access request. Subsequently, the application may add the keyword to a new access request. Correspondingly, after receiving the keyword through the database access initiation module, the database access service engine sends the new access request to a database instance associated with the keyword. In this way, it is ensured that all new access requests, sent by the application, that carry the keyword are sent to the database instance for processing, to ensure consistency of a transaction formed by the plurality of new access requests that carry the keyword.

For example, for the new connection established between the database access service engine 121 and the database instance 231, the database access service engine 121 may send a keyword (used to identify the newly established connection) to the database access initiation module 111, so that the database access initiation module 111 can feed back the keyword to the application that previously generated the access request. Subsequently, the application may add the keyword to a new access request. Correspondingly, after receiving the keyword by using the database access initiation module 111, the database access service engine 121 sends the new access request to the database instance 231 associated with the keyword.

Step S415: The database instance sends a processing result corresponding to the access request to the database access service engine.

After receiving the access request sent by the database access service engine, the database instance processes the access request, and obtains the processing result. The database instance sends the processing result corresponding to the access request to the database access service engine.

For example, the database instance 231 receives an access request sent by the access service engine 121. The database instance 231 processes the access request, for example, executes a statement, in an SQL format, that is carried in the access request. For example, data is searched for by using the statement in the SQL format to obtain a search result. The database instance 231 sends a processing result (for example, the search result) corresponding to the access request to the access service engine 121. If a JDBC connection is established between the database instance 231 and the access service engine 121, the JDBC connection is used to communicate the access request and the processing result between the database instance 231 and the access service engine 121.

Step S416: The database access service engine sends the processing result corresponding to the access request to the database access initiation module.

The database access service engine that previously forwarded the access request sends the processing result corresponding to the access request to the database access initiation module that previously forwarded the access request. For example, if the access request is forwarded to the database instance 231 through the database access initiation module 111 and the database access service engine 121, the database instance 231 sends the processing result corresponding to the access request to the database access service engine 121, so that the database access service engine 121 sends the processing result to the database access initiation module 111.

Step S417: The database access initiation module sends the processing result corresponding to the access request to the application.

The database access initiation module that previously forwarded the access request sends the processing result corresponding to the access request to the application that generates the access request (namely, the application served by the database access initiation module). For example, after receiving the processing result corresponding to the access request from the access service engine 121, the database access initiation module 111 sends the processing result to the application that previously generated the access request. In this way, the application obtains the processing result corresponding to the access request, for example, the search result obtained by the database instance 231 through searching based on the statement, in the SQL format, that is included in the access request.

Figure 5:
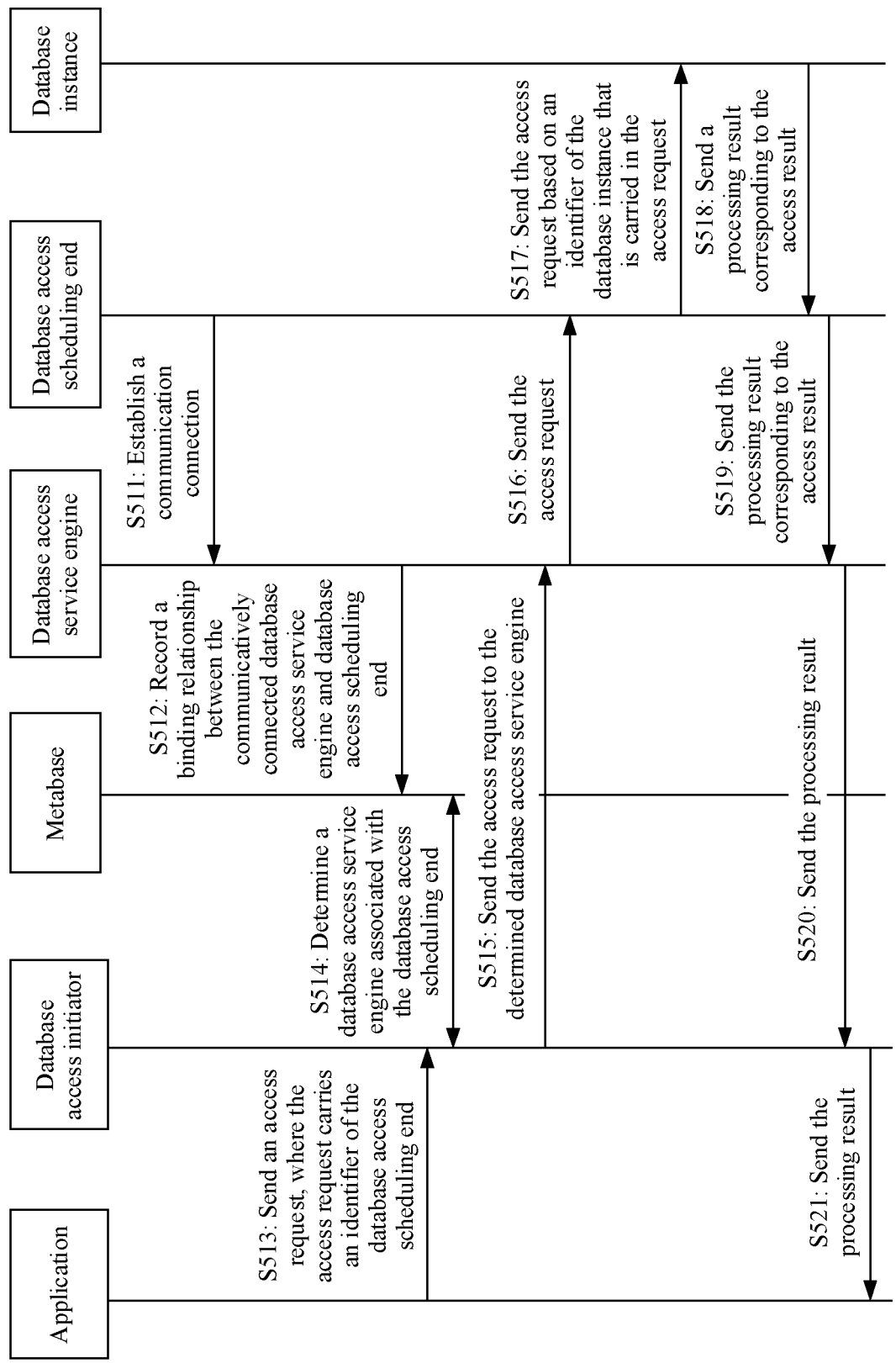
FIG. 5 is a schematic flowchart of a database access method according to this application.

Based on the architecture shown in FIG. 3, this application provides a database access method. With reference to FIG. 3, FIG. 5 shows a procedure of the database access method. The procedure includes step S511 to step S521.

Step S511: A database access scheduling module establishes a communication connection to a database access engine.

In a possible implementation, with reference to FIG. 3, the database access scheduling module and the database access service engine are deployed in a same network, and a communication connection may be established between the database access scheduling module and the database access service engine in the network. For example, both the database access scheduling module 333 and the database access service engine 122 are deployed in a public cloud to provide a service. Both the database access scheduling module 333 and the database access service engine 122 are deployed in a network used by the public cloud. The database access scheduling module 333 establishes a communication connection to the database access service engine 122 by using an IP address of the database access service engine 122. Alternatively, the database access service engine 122 establishes a communication connection to the database access scheduling module 333 by using an IP address of the database access scheduling module 333.

In a possible implementation, with reference to FIG. 3, the database access scheduling module is located in a local area network. The database access engine is not located in the local area network. In other words, the database access engine and the database access scheduling module are not located in the same local area network. For example, the database access scheduling module 331 in the local area network 381 obtains the IP address of the database access service engine 121. For example, the IP address of the database access service engine 121 is recorded in the database access scheduling module 331 in advance. For example, the IP address of the database access service engine 121 is manually entered into the database access scheduling module 331. The database access scheduling module 331 actively requests to establish a communication connection (for example, the communication connection may be a TCP-based communication connection) to the database access service engine 121 based on the IP address. In this way, the database access scheduling module 331 may establish the communication connection to the database access service engine 121. Similarly, the database access scheduling module 332 may actively establish a communication connection to the database access service engine 122 based on the IP address of the database access service engine 122. The database access scheduling module 333 may actively establish the communication connection to the database access service engine 122 based on the IP address of the database access service engine 122. It may be learned that each database access scheduling module may actively establish a communication connection to a database access service engine based on an IP address of the database access service engine.

It should be learned that the communication connection established between the database access scheduling module and the database access engine may be a TCP-based communication connection, or may be a communication connection established over another protocol. In this way, based on the communication connection, data may be communicated between the database access scheduling module and the database access engine.

When the database access scheduling module successfully establishes the communication connection (for example, the communication connection may be a TCP-based communication connection) to the database access engine, the database access engine records a binding relationship between an identifier of the database access scheduling module and the communication connection.

For example, when the database access scheduling module 331 successfully establishes the communication connection to the database access service engine 121, the database access service engine 121 records a binding relationship between the identifier of the database access scheduling module 331 and the communication connection (the communication connection between the database access scheduling module 331 and database access service engine 121). When the database access scheduling module 332 successfully establishes the communication connection to the database access service engine 122, the database access service engine 122 records a binding relationship between the identifier of the database access scheduling module 332 and the communication connection (the communication connection between the database access scheduling module 332 and database access service engine 122). When the database access scheduling module 333 successfully establishes the communication connection to the database access service engine 122, the database access service engine 122 records a binding relationship between the identifier of the database access scheduling module 333 and the communication connection (the communication connection between the database access scheduling module 333 and database access service engine 122).

Step S512: The database access engine records, in the metabase 14, a binding relationship between the communicatively connected database access service engine and database access scheduling module.

In a possible implementation, a single database access scheduling module actively requests to establish a communication connection to a single database access service engine. If the communication connection is successfully established, the database access engine records, in the metabase 14, a binding relationship between the database access scheduling module and the database access service engine.

The binding relationship between the single database access scheduling module and the single database access service engine may include an identifier of the database access scheduling module and an identifier of the database access service engine.

For example, the database access scheduling module 332 may actively establish the communication connection to the database access service engine 122 by using the IP address of the database access service engine 122. If the communication connection is successfully established, the database access service engine 122 records, in the metabase 14, a binding relationship corresponding to the communication connection. The binding relationship includes the identifier of the database access scheduling module 332 (for example, a keyword of the database access scheduling module 332) and an identifier of the database access service engine 122 (for example, the IP address of the database access service engine 122). Similarly, the database access scheduling module 333 may actively establish the communication connection to the database access service engine 122 by using the IP address of the database access service engine 122. If the communication connection is successfully established, the database access service engine 122 records, in the metabase 14, a binding relationship corresponding to the communication connection. The binding relationship includes the identifier of the database access scheduling module 333 (for example, a keyword of the database access scheduling module 333) and the identifier of the database access service engine 122 (for example, the IP address of the database access service engine 122).

In this way, load of a single database access service engine may be determined based on a quantity, recorded in the metabase 14, of binding relationships of the database access service engine. Optionally, as shown in FIG. 3, the binding relationship may be a binding relationship between a database access scheduling module and the database access service engine (for example, a binding relationship between the identifier of the database access scheduling module 333 and the identifier of the database access service engine 122, or a binding relationship between the identifier of the database access scheduling module 331 and the identifier of the database access service engine 121), or the binding relationship may be a binding relationship between an identifier of a database instance and the database access service engine (for example, a binding relationship between the identifier of the database instance 374 and the database access service engine 123). In this way, all binding relationships of the database access service engine may be comprehensively considered to evaluate the load of the database access service engine.

In addition, a database access initiation module may search the metabase 14 based on the identifier of the database access scheduling module that is carried in the access request, to find a binding relationship matching the identifier of the database access scheduling module. In this way, the access request is sent to the database access service engine specified by the binding relationship.

Step S513: An application sends an access request to the database access initiation module.

The application sends the access request to the database access initiation module that provides a service for the application. For example, the database access initiation module 111 provides a service for an application. Access requests generated by the application are all sent by the application to the database access initiation module 111.

The access request carries an identifier of the database access scheduling module. The identifier of the database access scheduling module may be an IP address of the database access scheduling module. In a possible implementation, the identifier of the database access scheduling module may be the IP address and a port number of the database access scheduling module.

In addition, the access request carries an identifier of a database instance. In this way, a database instance used to process the access request may be determined based on the identifier of the database instance.

For example, the identifier of the database instance is an IP address of the database instance. For example, the identifier of the database instance is the IP address and a port number of the database instance.

For example, the identifier of the database instance includes a name of the database instance. In this way, whether the database instance is a database instance that needs to be accessed may further be determined based on the name of the database instance.

For example, the identifier of the database instance may be one or a combination of more of the following parameters: the IP address of the database instance, the IP address and the port number, or the name of the database instance.

For example, the access request may carry a statement in an SQL format. In this way, the database instance may execute the statement, in the SQL format, that is carried in the access request.

For example, the access request carries an identifier of a service currently provided by the application.

Step S514: The database access initiation module determines the database access service engine associated with the database access scheduling module.

Step S515: The database access initiation module sends the access request to the determined database access service engine.

The database access initiation module searches the metabase 14 based on the identifier of the database access scheduling module that is carried in the access request, to find the binding relationship matching the identifier of the database access scheduling module. The database access initiation module sends the access request to the database access service engine specified by the binding relationship.

For example, the database access initiation module 113 uses the identifier of the database access scheduling module 333 that is carried in the access request to find, in the metabase 14, a binding relationship corresponding to the identifier of the database access scheduling module 333. The binding relationship records the identifier of the database access service engine 122. In this case, the database access initiation module 113 sends the access request to the database access service engine 122.

For example, the database access initiation module 111 uses the identifier of the database access scheduling module 331 that is carried in the access request to find, in the metabase 14, a binding relationship corresponding to the identifier of the database access scheduling module 331. The binding relationship records the identifier of the database access service engine 121. In this case, the database access initiation module 111 sends the access request to the database access service engine 121.

Step S516: The database access service engine sends the access request to the database access scheduling module.

The access request carries the identifier of the database access scheduling module. The database access service engine searches, based on the identifier of the database access scheduling module, for the binding relationship matching the identifier of the database access scheduling module. The binding relationship records the identifier of the database access scheduling module and the communication connection between the database access service engine and the database access scheduling module. In this way, the database access service engine sends the access request to the database access scheduling module based on the communication connection.

For example, with reference to FIG. 3, the database access service engine 121 records the binding relationship between the identifier of the database access scheduling module 331 and the communication connection (the communication connection between the database access scheduling module 331 and the database access service engine 121). When the database access service engine 121 receives an access request, if the access request carries the identifier of the database access scheduling module 331, the database access service engine 121 sends the access request to the database access scheduling module 331 based on the communication connection recorded in the binding relationship.

For example, with reference to FIG. 3, the database access service engine 122 records the binding relationship between the identifier of the database access scheduling module 332 and the communication connection (the communication connection between the database access scheduling module 332 and the database access service engine 122). When the database access service engine 122 receives an access request, if the access request carries the identifier of the database access scheduling module 332, the database access service engine 122 sends the access request to the database access scheduling module 332 based on the communication connection recorded in the binding relationship.

For example, with reference to FIG. 3, the database access service engine 122 records the binding relationship between the identifier of the database access scheduling module 333 and the communication connection (the communication connection between the database access scheduling module 333 and the database access service engine 122). When the database access service engine 122 receives an access request, if the access request carries the identifier of the database access scheduling module 333, the database access service engine 122 sends the access request to the database access scheduling module 333 based on the communication connection recorded in the binding relationship.

Step S517: The database access scheduling module sends the access request to the database instance specified by the access request.

The access request carries the identifier of the database instance. The database access scheduling module sends the access request to the database instance specified by the identifier. Optionally, the database access scheduling module and the database instance are located in a same local area network.

For example, in the local area network 381, when the database access scheduling module 331 receives an access request, if the access request carries an identifier of the database instance 371, the database access scheduling module 331 sends the access request to the database instance 371; if the access request carries an identifier of the database instance 372, the database access scheduling module 331 sends the access request to the database instance 372, so that the database instance 372 can process the access request.

For example, when the database access scheduling module 333 receives an access request, if the access request carries an identifier of the database instance 373, the database access scheduling module 333 sends the access request to the database instance 373; if the access request carries an identifier of the database instance 374, the database access scheduling module 333 sends the access request to the database instance 374.

The database instance processes the access request to obtain a processing result. For example, the access request carries a statement in an SQL format. The database instance searches for data based on the statement in the SQL format, to obtain a search result.

Step S518: The database instance sends the processing result corresponding to the access request to the database access scheduling module.

The database instance sends the processing result corresponding to the access request to the database access scheduling module that previously forwarded the access request to the database instance.

For example, if the database access scheduling module 331 previously sent the access request to the database instance 371, the database instance 371 processes the access request to obtain a processing result, and correspondingly sends the processing result to the database access scheduling module 331.

For example, if the database access scheduling module 333 previously sent the access request to the database instance 373, the database instance 373 processes the access request to obtain a processing result, and correspondingly sends the processing result to the database access scheduling module 333.

Step S519: The database access scheduling module sends the processing result corresponding to the access request to the database access service engine.

The database access service engine is the database access service engine that previously sent the access request to the database access scheduling module. After the database access scheduling module obtains the processing result corresponding to the access request from the database instance, the database access scheduling module sends the processing result to the database access service engine.

For example, after receiving the processing result corresponding to the access request, the database access scheduling module 331 sends the processing result to the database access service engine 121 through the communication connection between the database access scheduling module 331 and the database access service engine 121.

For example, after receiving the processing result corresponding to the access request, the database access scheduling module 333 sends the processing result to the database access service engine 122 through the communication connection between the database access scheduling module 333 and the database access service engine 122.

Step S520: The database access service engine sends the processing result corresponding to the access request to the database access initiation module.

The database access service engine that previously forwarded the access request sends the processing result corresponding to the access request to the database access initiation module that previously forwarded the access request.

For example, if the access request is forwarded to the database access scheduling module 331 through the database access initiation module 111 and the database access service engine 121, after the database access scheduling module 331 sends the processing result corresponding to the access request to the database access service engine 121, the database access service engine 121 sends the processing result to the database access initiation module 111.

For example, if the access request is forwarded to the database access scheduling module 333 through the database access initiation module 112 and the database access service engine 122, after the database access scheduling module 333 sends the processing result corresponding to the access request to the database access service engine 122, the database access service engine 122 sends the processing result to the database access initiation module 112.

Step S521: The database access initiation module sends the processing result corresponding to the access request to the application.

The database access initiation module that previously forwarded the access request sends the processing result corresponding to the access request to the application that generates the access request (namely, the application served by the database access initiation module). For example, after receiving the processing result corresponding to the access request from the access service engine 121, the database access initiation module 111 sends the processing result to the application that previously generated the access request. In this way, the application obtains the processing result corresponding to the access request, for example, the search result obtained by the database instance 231 through searching based on the statement, in the SQL format, that is included in the access request.

If the database instance is located in a local area network, step S511 to step S521 may be performed to enable the application to access the database instance in the local area network. In an application scenario, the application, the database access initiation module 111, and the access service engine 121 are all deployed in the public cloud, and the database access scheduling module 331, the database instance 371, and the database instance 372 are deployed in a private cloud. The network used by the public cloud is different from the local area network 381 used by the private cloud. However, the database access scheduling module 331 successfully establishes the communication connection to the access service engine 121 in advance by using the IP address of the access service engine 121. Based on the communication connection, the application may access the database access scheduling module 331 in the local area network 381 by using the access service engine 121. In this way, indirect access to a database instance (for example, the database instance 371 or the database instance 372) in the local area network 381 is implemented.

If the database instance and the database access service engine are located in a same network (for example, the network used by the public cloud), step S511 to step S521 may be performed to enable the application to access the database instance in the same network.

Based on the architecture shown in FIG. 3, this application provides a database access method. With reference to FIG. 3, in the procedure of the database access method shown in FIG. 5, the steps included in the database access method are further optimized from a perspective of security.

In a possible implementation of step S511, when actively establishing the communication connection to the database access engine, the database access scheduling module sends a public key of the database access engine to the database access engine, so that the database access engine performs, based on the public key, authentication on whether to agree to establish the communication connection. In addition, if the communication connection is successfully established, the database access scheduling module uses the public key to encrypt data that needs to be sent to the database access engine.

For example, in the architecture shown in FIG. 3, the database access engine 122 generates a public key and a private key that are used by the database access engine 122, and stores the public key and the private key in the metabase 14. The database access scheduling module requests, by using the public key of the database access engine 122, to establish a communication connection to the database access engine 122, and the database access engine 122 uses the public key to search the metabase 14. If the public key is the public key of the database access engine 122 according to a record in the metabase 14, the authentication succeeds, and the database access engine 122 successfully establishes the communication connection to the database access scheduling module. Subsequently, based on the communication connection between the database access engine 122 and the database access scheduling module (for example, the database access scheduling module 332 or the database access scheduling module 333), for data that needs to be sent by the database access scheduling module to the database access engine 122, the database access scheduling module encrypts the data by using the public key of the database access engine 122, and then sends the encrypted data to the database access engine 122 based on the communication connection.

In a possible implementation of step S518, for the processing result corresponding to the access request that is sent by the database access scheduling module to the database access engine, the database access scheduling module encrypts the processing result by using the public key of the database access engine, and then sends the encrypted processing result to the database access engine.

For example, in the architecture shown in FIG. 3, after the database access scheduling module 333 receives the processing result corresponding to the access request from the database instance 373, the database access scheduling module 333 encrypts the processing result by using the public key of the database access engine 122, and sends the encrypted processing result to the database access engine 122.

In a possible implementation, data (for example, an access request generated by an application) sent by the database access engine to the database access scheduling module is encrypted by using a public key of the database access scheduling module, and the database access engine sends the encrypted data to the database access scheduling module. Correspondingly, the database access scheduling module decrypts the encrypted data by using a private key of the database access scheduling module to obtain the data.

For example, the database access scheduling module 332 generates a public key and a private key that are used by the database access scheduling module 332, and stores the public key and the private key. The database access scheduling module 332 sends the public key to the database access engine 122. Subsequently, the database access engine 122 encrypts the access request by using the public key, and then sends the encrypted access request to the database access scheduling module 332. Correspondingly, the database access scheduling module 332 decrypts the encrypted access request by using the private key to obtain the access request.

This application further provides a database access initiation module (for example, the database access initiation module 111, the database access initiation module 112, or the database access initiation module 113). The database access initiation module is deployed on a computing device (for example, a server) in this application. The database access initiation module includes functional units configured for the database access initiation module to implement the database access method. A division manner for the functional units in the database access initiation module is not limited in this application. The following provides an example of division for the functional units, as shown in FIG. 6.

Figure 6:
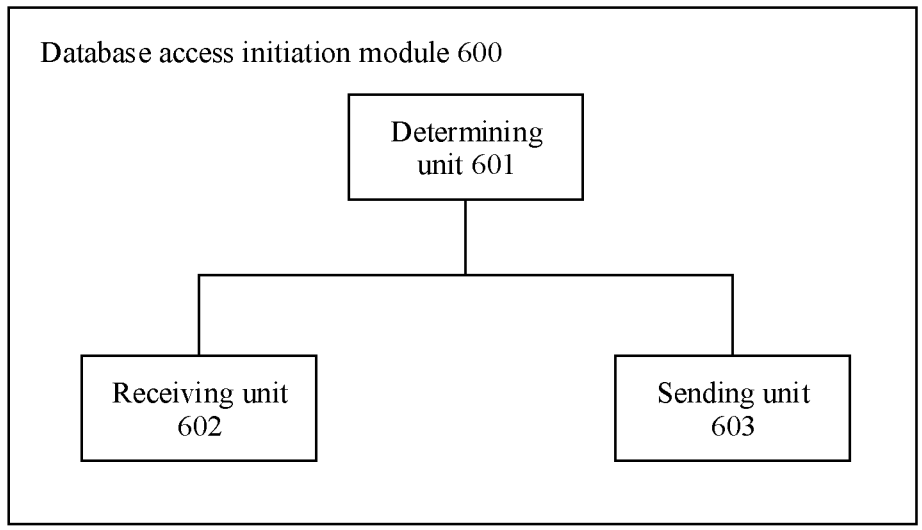
FIG. 6 is a schematic diagram of a logical structure of a database access initiation module 600 according to this application.

A database access initiation module 600 is shown in FIG. 6. The database access initiation module 600 includes:
- a receiving unit 602, configured to receive an access request of the application, where the access request carries an identifier of a database instance;
- a determining unit 601, configured to determine a database access service engine, where the database access service engine is independent of the application, and the database access service engine is used to establish a connection used to access the database instance; and
- a sending unit 603, configured to send the access request to the determined database access service engine, where the database access service engine has a capability of sending the access request to the database instance.

Optionally, the determining unit 601 is configured to select one database access service engine from a plurality of database access service engines.

Optionally, the determining unit 601 is configured to select one database access service engine from a plurality of database access service engines based on load of the plurality of database access service engines.

Optionally, the determining unit 601 is configured to select a database access service engine with smallest load from a plurality of database access service engines.

Optionally, the determining unit 601 is configured to determine, based on the identifier of the database instance that is carried in the access request, a database access service engine bound to the identifier of the database instance.

Optionally, the determining unit 601 is configured to determine, based on an identifier of a database access scheduling module that is carried in the access request, a database access service engine bound to the database access scheduling module. The database access scheduling module is used to send the access request received from the database access service engine to the database instance.

Optionally, the receiving unit 602 is configured to receive a processing result, corresponding to the access request, that is sent by the database access service engine. Correspondingly, the sending unit 603 is configured to send the processing result to the application.

This application further provides a database access service engine (for example, the database access service engine 121, the database access service engine 122, or the database access service engine 123). The database access service engine is deployed on a computing device (for example, a server) in this application. The database access service engine includes functional units configured for the database access initiation module to implement the database access method. A division manner for the functional units in the database access service engine is not limited in this application. The following provides an example of division for the functional units, as shown in FIG. 7.

Figure 7:
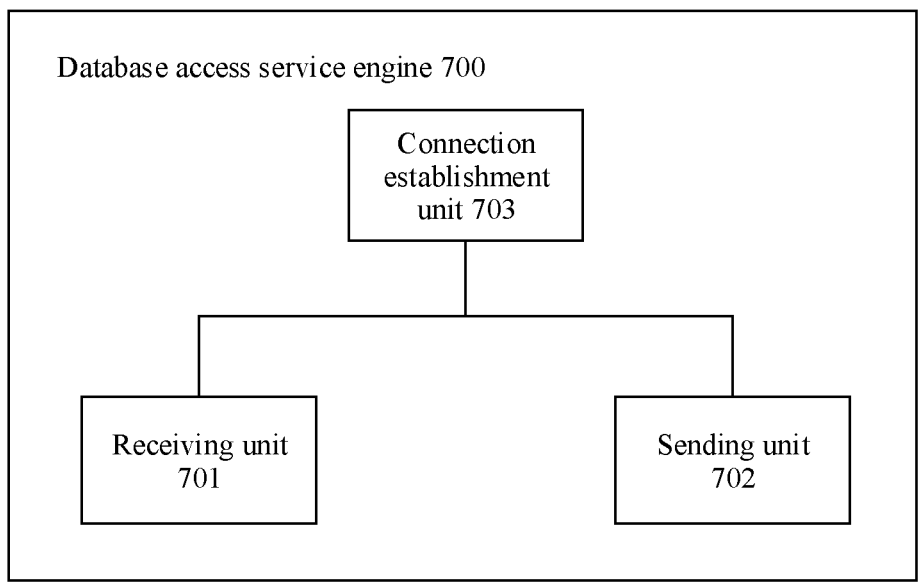
FIG. 7 is a schematic diagram of a logical structure of a database access service engine 700 according to this application.

A database access service engine 700 is shown in FIG. 7. The database access service engine 700 includes:
- a receiving unit 701, configured to receive an access request sent by a database access initiation module, where the access request carries an identifier of a database instance; and
- a sending unit 702, configured to send the access request to the database instance, or send the access request to a database access scheduling module associated with the database instance.

Optionally, the database access service engine includes:
- a connection establishment unit 703, configured to establish a connection between the database access service engine and the database instance based on the identifier of the database instance, where the connection is used to communicate data between the database access service engine and the database instance.

Optionally, the sending unit 702 is configured to send, based on a keyword carried in the access request, the access request to the database instance through the connection that is identified by the keyword and that has been established between the database access service engine and the database instance.

Optionally, the sending unit 702 is configured to send the access request to the database access scheduling module based on an identifier, of the database access scheduling module, that is carried in the access request.

Optionally, the receiving unit 701 is configured to receive a processing result that is corresponding to the access request and that is sent by the database instance, or receive a processing result that is corresponding to the access request and that is sent by the database access scheduling module.

Correspondingly, the sending unit 702 is configured to send the processing result corresponding to the access request to the database access initiation module.

This application further provides a database access scheduling module (for example, the database access scheduling module 331, the database access scheduling module 332, or the database access scheduling module 333). The database access scheduling module is deployed on a computing device (for example, a server) in this application. The database access scheduling module includes functional units configured for the database access scheduling module to implement the database access method. A division manner for the functional units in the database access scheduling module is not limited in this application. The following provides an example of division for the functional units, as shown in FIG. 8.

Figure 8:
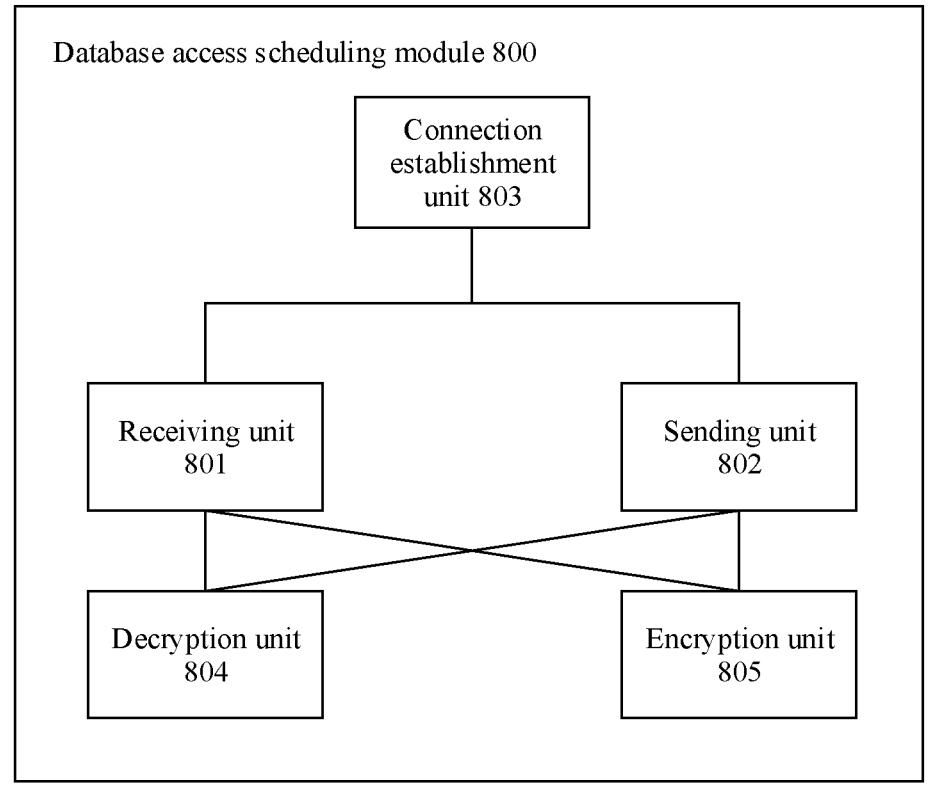
FIG. 8 is a schematic diagram of a logical structure of a database access scheduling module 800 according to this application.

A database access scheduling module 800 is shown in FIG. 8, and the database access scheduling module 800 includes:
- a connection establishment unit 803, configured to establish a communication connection to a database access service engine by using an identifier of the database access service engine;
- a receiving unit 801, configured to receive an access request sent by the database access service engine, where the access request carries an identifier of a database instance; and
- a sending unit 802, configured to send the access request to the database instance.

Optionally, the identifier of the database access service engine is an IP address of the database access service engine.

Optionally, the connection establishment unit 803 is configured to send a request for establishing the communication connection to the database access service engine. The request carries the identifier of the database access service engine and a public key of the database access service engine. The public key of the database access service engine is used by the database access engine to attempt to authenticate establishment of the communication connection.

Optionally, the database access scheduling module 800 includes:

a decryption unit 804, configured to: when the access request received by the database access scheduling module from the database access service engine is an access request encrypted based on a public key of the database access scheduling module, decrypt the encrypted access request by using a private key of the database access scheduling module to obtain the access request, so that the sending unit 802 can send the decrypted access request to the database instance.

Optionally, the receiving unit 801 is configured to receive a processing result, corresponding to the access request, that is sent by the database instance.

The sending unit 802 is configured to send the processing result to the database access service engine.

Optionally, the database access scheduling module 800 includes:

an encryption unit 805, configured to encrypt the processing result by using the public key of the database access service engine, so that the sending unit 802 can send the encrypted processing result to the database access service engine.

Figure 9:
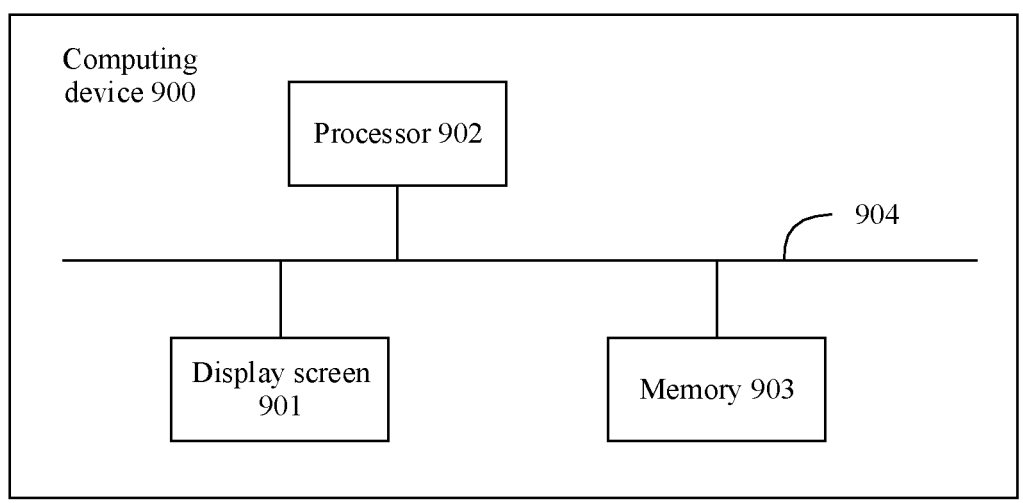
FIG. 9 is a schematic diagram of a structure of a computing device 900 according to this application.

Optionally, FIG. 9 is a schematic diagram of a possible basic hardware architecture of the computing device in this application.

Refer to FIG. 9. A computing device 900 includes a processor 901, a memory 902, a communications interface 903, and a bus 904.

In the computing device 900, there may be one or more processors 901. FIG. 9 shows only one of the processors 901. Optionally, the processor 901 may be a central processing unit (CPU). If the computing device 900 includes a plurality of processors 901, the plurality of processors 901 may be of a same type or different types. Optionally, the plurality of processors 901 of the computing device 900 may be integrated into a multi-core processor.

The memory 902 stores computer instructions and data. The memory 902 may store computer instructions and data required for implementing the database access method provided in this application. For example, the memory 902 stores instructions used to implement the steps performed by the database access initiation module in the database access method. For another example, the memory 902 stores instructions used to implement the steps performed by the database access service engine in the database access method. For another example, the memory 902 stores instructions used to implement the steps performed by the database access implementation module (for example, the database instance or the database access scheduling module) in the database access method. The memory 902 may be any one or any combination of the following storage media: a nonvolatile memory (for example, a read-only memory (ROM), a solid-state drive (SSD), a hard disk drive (HDD), or an optical disc) and a volatile memory.

The communications interface 903 may be any one or any combination of the following components with a network access function, such as a network interface (for example, an Ethernet interface) and a wireless network interface card.

The communications interface 903 is configured to perform data communication between the computing device 900 and another computing device or terminal.

A thick line is used to represent the bus 904 in FIG. 9. The processor 901, the memory 902, and the communications interface 903 may be connected by using the bus 904. In this way, by using the bus 904, the processor 901 may access the memory 902, and may further exchange data with another computing device or terminal through the communications interface 903.

In this application, the computing device 900 executes the computer instructions in the memory 902, so that the computing device 900 is enabled to implement the database access method provided in this application. For example, the computing device is enabled to perform the steps performed by the database access initiation module in the database access method. For another example, the computing device is enabled to perform the steps performed by the database access service engine in the database access method. For another example, the computing device is enabled to perform the steps performed by the database access implementation module (for example, the database instance or the database access scheduling module) in the database access method.

This application provides a computer-readable storage medium. The computer-readable storage medium stores computer instructions. When the processor 901 of the computing device 900 executes the computer instructions, the computing device 900 performs the steps performed by the database access initiation module in the database access method, or the computing device 900 performs the steps performed by the database access service engine in the database access method, or the computing device 900 performs the steps performed by the database access implementation module (for example, the database instance or the database access scheduling module) in the database access method.

This application provides a computer program product. The computer program product includes computer instructions, and the computer instructions are stored in the computer-readable storage medium. The processor 901 of the computing device 900 may read the computer instructions from the computer-readable storage medium. The processor 901 executes the computer instructions, so that the computing device 900 is enabled to perform the steps performed by the database access initiation module in the database access method, or the computing device 900 is enabled to perform the steps performed by the database access service engine in the database access method, or the computing device 900 is enabled to perform the steps performed by the database access implementation module (for example, the database instance or the database access scheduling module) in the database access method.

This application provides a computer program product. The computer program product includes computer instructions, and the computer instructions are stored in the computer-readable storage medium. The processor 901 of the computing device 900 may read the computer instructions from the computer-readable storage medium. The processor 901 executes the computer instructions, so that the computing device 900 is enabled to perform the steps performed by the database access initiation module in the database access method, or the computing device 900 is enabled to perform the steps performed by the database access service engine in the database access method, or the computing device 900 is enabled to perform the steps performed by the database access implementation module (for example, the database instance or the database access scheduling module) in the database access method.

The foregoing embodiments are merely intended for describing the technical solutions of the present disclosure, but not for limiting the disclosed embodiments. Although the present disclosure is described in detail with reference to the foregoing embodiments, persons of ordinary skill in the art should understand that they may still make modifications to the technical solutions described in the foregoing embodiments, without departing from the protection scope of the claims.

What is claimed is:

1. A database access method, comprising:
actively establishing, by a database access scheduling module in a local area network, a communication connection to a database access service engine in a public cloud by using an identifier of the database access service engine;
recording, by an application in the public cloud, a database instance in the local area network and the database access service engine bound to the database instance;
generating, by the application, an access request, the access request specifying the database instance to be accessed in the local area network;
sending, by database access service engine, the access request to the database access scheduling module;
receiving, by the database access scheduling module, an access request sent by the database access service engine, the access request carrying an identifier of a database instance, and the identifier of the database instance is an IP address of the database instance, or the identifier of the database instance is an IP address and a port number of the database instance;
sending, by the database access scheduling module and according to the identifier of the database instance, the access request to the database instance of multiple database instances in the local area network;
receiving, by the database access scheduling module and from the database instance, a processing result corresponding to the access request; and
sending, by the database access scheduling module and to the database access service engine, so that the application obtains the processing result corresponding to the access request.

2. The method according to claim 1, wherein the identifier of the database access service engine is an IP address of the database access service engine.

3. The method according to claim 1, wherein the establishing, by the database access scheduling module, the communication connection to the database access service engine using the identifier of the database access service engine comprises:
sending, by the database access scheduling module, a request for establishing the communication connection to the database access service engine, the request carrying the identifier of the database access service engine and a public key of the database access service engine, and the public key of the database access service engine is used by the database access engine to authenticate establishment of the communication connection.

4. The method according to claim 1, wherein the method further comprises:
when the access request received by the database access scheduling module from the database access service engine is an access request that is encrypted based on a public key of the database access scheduling module, decrypting, by the database access scheduling module, the encrypted access request using a private key of the database access scheduling module to obtain a decrypted access request, wherein the decrypted access request is sent to the database instance.

5. The method according to claim 1, wherein the method further comprises:
encrypting, by the database access scheduling module, the processing result using a public key of the database access service engine, so that the database access scheduling module sends an encrypted processing result to the database access service engine.

6. The method according to claim 1, wherein the database access service engine is independent of an application that generates the access request.

7. The database access method according to claim 1, wherein the database access service engine is independent of an application that generates the access request.

8. A computing device, comprising:
a memory storing instructions; and
at least one processor in communication with the memory, the at least one processor configured, upon execution of the instructions, to enable the computing device to work as an application or a database access scheduling module or a database access service engine, so that the computing device performs at least one of the following steps:
actively establishing, by a database access scheduling module in a local area network, a communication connection to a database access service engine in a public cloud by using an identifier of the database access service engine;
recording, by an application in the public cloud, a database instance in the local area network and the database access service engine bound to the database instance;
generating, by the application, an access request, the access request specifying the database instance to be accessed in the local area network;
sending, by database access service engine, the access request to the database access scheduling module;
receiving, by the database access scheduling module, an access request sent by the database access service engine, the access request carrying an identifier of a database instance, and the identifier of the database instance is an IP address of the database instance, or the identifier of the database instance is an IP address and a port number of the database instance; and
sending, by the database access scheduling module and according to the identifier of the database instance, the access request to the database instance of multiple database instances in the local area network;
receiving, by the database access scheduling module and from the database instance, a processing result corresponding to the access request; and
sending, by the database access scheduling module and to the database access service engine, so that the application obtains the processing result corresponding to the access request.

9. The computing device according to claim 8, wherein the identifier of the database access service engine is an IP address of the database access service engine.

10. The computing device according to claim 8, wherein the at least one processor further executes the instructions to send a request for establishing the communication connection to the database access service engine, the request carrying the identifier of the database access service engine and a public key of the database access service engine, and the public key of the database access service engine is used by the database access engine to authenticate establishment of the communication connection.

11. The computing device according to claim 8, wherein the at least one processor further executes the instructions to, when the access request received by the database access scheduling module from the database access service engine is an access request that is encrypted based on a public key of the database access scheduling module, decrypt the encrypted access request using a private key of the database access scheduling module to obtain a decrypted access request, wherein the sending unit sends the decrypted access request to the database instance.

12. The computing device according to claim 8, wherein the at least one processor further executes the instructions to encrypt the processing result using a public key of the database access service engine, so that the sending unit sends an encrypted processing result to the database access service engine.

13. The computing device according to claim 8, wherein the database access service engine is independent of an application that generates the access request.

14. A non-transitory computer-readable media storing computer instructions, that when executed by at least one processor, causes the at least one processor to perform the steps of:

actively establishing, by a database access scheduling module in a local area network, a communication connection to a database access service engine in a public cloud by using an identifier of the database access service engine;

recording, by an application in the public cloud, a database instance in the local area network and the database access service engine bound to the database instance;

generating, by the application, an access request, the access request specifying the database instance to be accessed in the local area network;

sending, by database access service engine, the access request to the database access scheduling module;

receiving, by the database access scheduling module, an access request sent by the database access service engine, the access request carrying an identifier of a database instance, and the identifier of the database instance is an IP address of the database instance, or the identifier of the database instance is an IP address and a port number of the database instance; and sending, by the database access scheduling module and according to the identifier of the database instance, the access request to the database instance of multiple database instances in the local area network;

receiving, by the database access scheduling module and from the database instance, a processing result corresponding to the access request; and sending, by the database access scheduling module and to the database access service engine, so that the application obtains the processing result corresponding to the access request.

15. The non-transitory computer-readable media according to claim 14, wherein the identifier of the database access service engine is an IP address of the database access service engine.

16. The non-transitory computer-readable media according to claim 14, wherein the establishing the communication connection to the database access service engine using the identifier of the database access service engine comprises:

sending a request for establishing the communication connection to the database access service engine, the request carrying the identifier of the database access service engine and a public key of the database access service engine, and the public key of the database access service engine is used by the database access engine to authenticate establishment of the communication connection.

17. The non-transitory computer-readable media according to claim 14, wherein the instructions are further executed by the at least one processor to:

when the access request received by the database access scheduling module from the database access service engine is an access request that is encrypted based on a public key of the database access scheduling module, decrypt, by the database access scheduling module, the encrypted access request using a private key of the database access scheduling module to obtain a decrypted access request, wherein the decrypted access request is sent to the database instance.

18. The non-transitory computer-readable media according to claim 14, wherein the instructions are further executed by the at least one processor to:

encrypt the processing result using a public key of the database access service engine, so that the database access scheduling module sends an encrypted processing result to the database access service engine.

19. The non-transitory computer-readable media according to claim 14, wherein the database access service engine is independent of an application that generates the access request.

* * * * *